United States Patent [19]

Kato

[11] 4,345,725

[45] Aug. 24, 1982

[54] BRAKING MECHANISM OF A TAPE RECORDER

[75] Inventor: Toshikazu Kato, Hachioji, Japan

[73] Assignee: Olympus Optical Co., Ltd., Tokyo, Japan

[21] Appl. No.: 154,443

[22] Filed: May 29, 1980

[30] Foreign Application Priority Data

Jun. 18, 1979 [JP] Japan .................... 54-83250[U]

[51] Int. Cl.³ .................... G03B 1/04; G11B 15/32
[52] U.S. Cl. .................... 242/204
[58] Field of Search ............ 242/75, 75.4, 200–204, 242/67, 67.4, 198

[56] References Cited

U.S. PATENT DOCUMENTS 2,930,540  3/1960  Obolensky .................... 242/204
4,022,401  3/1977  Kishi .................... 242/198

FOREIGN PATENT DOCUMENTS 2816145  11/1978  Fed. Rep. of Germany .
4723922   2/1962  Japan .................... 242/204
4327769   4/1966  Japan .................... 242/204

Primary Examiner—Leonard D. Christian
Attorney, Agent, or Firm—Frishauf, Holtz, Goodman & Woodward

[57] ABSTRACT

A braking mechanism having a brake band both ends of which are rotatably mounted on a substrate and the central portion of which is bent and connected to a link interlockingly operating with a playback button of a tape recorder. The mechanism further comprises a pair of brake discs which are provided respectively at the tape-feeding side and the take-up side of the tape recorder. The brake discs are each provided with a toothed brake member. The teeth of the brake members are so shaped that one of the brake members cuts into its corresponding brake shoe while the other brake member slipping engages its corresponding brake shoe.

5 Claims, 5 Drawing Figures

BRAKING MECHANISM OF A TAPE RECORDER

BACKGROUND OF THE INVENTION

This invention relates to a braking mechanism of a tape recorder, and more particularly to a braking mechanism utilizing a brake band.

At present a band brake type braking mechanism is widely accepted for a tape recorder. However, this conventional braking mechanism which comprises a pair of brake bands and groups of paired adjusting members such as braking force-adjusting plungers and springs, all acting independently for the respective reels, has the drawbacks that the entire construction is complicated and presents difficulties in stopping the tape accurately without sagging of the tape.

Also known is a tape recorder braking mechanism in which a single tension spring is attached to the center of a brake band. Though simplified in arrangement, this braking mechanism still has the drawback that the sagging of a tape can not be fully prevented when the tape is stopped.

SUMMARY OF THE INVENTION

It is accordingly the object of this invention to provide a braking mechanism which causes a brake to be actuated in good timing to apply a braking force to the respective reels, thereby preventing the sagging of the tape and stopping the tape at the desired position.

To this end, the present invention provides a tape recorder braking mechanism, wherein both ends of a brake band are rotatably supported; the central part of the brake band is bent; the central bent portion is rotatably coupled to a link interlockingly operating with a play button; and a pair of brake rings are provided respectively with braking attachments which, so to speak, cut into the brake band in the opposite directions when said paired brake rings contact the brake band.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
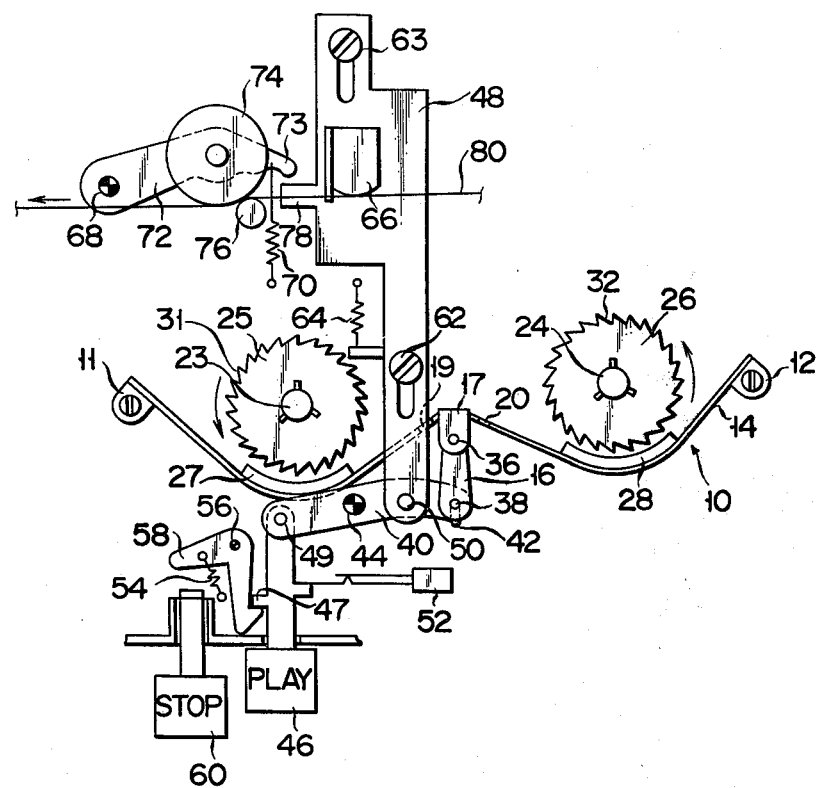
FIG. 1 is a plan view of the main section of a tape recorder which is fitted with a braking mechanism embodying this invention and set for the playback mode.
Figure 2:
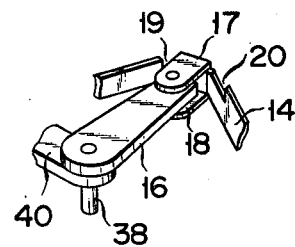
FIG. 2 is a schematic perspective view of a brake band and link.

Referring to FIG. 1 showing the plan view of a tape recorder fitted with the braking mechanism of this invention and set for the playback mode, the present braking mechanism 10 comprises a brake band 14 which is prepared from a flexible material and includes at the ends portions 11 and 12 respectively bent in the same direction. Both portions 11 and 12 are rotatably mounted on a substrate (not shown) by means of a screw. As seen from FIG. 2, the brake band 14 is provided with a connection attachment coupled to a link 16. With the illustrated embodiment, a pair of bent portions 17 and 18 (FIG. 2) formed at the central part of the brake band 14 jointly constitute the connection attachment. Notches 19 and 20 (FIG. 2) are formed in the upper surface of the brake band 14 close to the bent portion 17. The brake band 14 further comprises brake shoes 27 and 28 fitted to those portions of the inner wall of the brake band 14, which lie close to brake discs 25 and 26. These brake discs 25 and 26 are respectively fixed to the corresponding reel shafts 23 and 24. Toothed brake members 31 and 32 are formed on the peripheral edges of the brake discs 25 and 26. The teeth of the toothed brake members 31 and 32 are so shaped that when the brake discs 25 and 26 respectively contact the corresponding brake shoes 27 and 28 while being rotated in one direction, then either of the toothed brake members 31 and 32 has its teeth made to cut into the corresponding brake shoe 27 or 28, and that when the brake discs 25 and 26 respectively contact the corresponding brake shoes 27 and 28 while being rotated in the other direction, then the teeth of the same toothed brake member 31 or 32 slip over the corresponding brake shoe 27 or 28 without cutting thereinto. When, for example, the brake disc 25 is rotated clockwise of FIG. 1, then the teeth of the brake member 31 of the brake disc 25 whose position represents the tape take up side of the recording or playback mode cut into the corresponding brake shoe 27. When the brake disc 26 is rotated counterclockwise of FIG. 1, then the teeth of the brake member 32 of the brake disc 26 similarly cut into the corresponding brake shoe 28.

The link 16 is rotatably fitted to the central bent portions 17 and 18 of the brake band 14 by a pin 36, and further coupled to another link, for example, a seesaw lever 40 by a pin 38. This pin 38 is guided through an elongate guide slit 42 formed on the substrate. The seesaw lever 40 is rotatably mounted on the substrate by a pivotal pin 44. One end of the seesaw lever 40 is connected to a playback button 46 by a pin 49. The other end of the seesaw lever 40 is connected to a head-supporting board 48 by a pin 50. A main switch 52 is made engageable with the playback button 46 so as to be rendered conductive when the playback button 46 is pushed. Disposed adjacent to the playback button 46 is a lock lever 58 urged by a tension spring 54 to be rotated counterclockwise about a pivotal pin 56. This lock lever 58 is engaged with a engagement attachment 47 of the playback button 46 to keep the playback button 46 in a pressed state. A stop button 60 is made engageable with the lock lever 58. This stop button 60 causes the lock lever 58 to be rotated clockwise against the urging force of the tension spring 54, thereby releasing the playback button 46 from the lock lever 58.

The head-supporting board 48 connected to the seesaw lever 40 is slidably mounted on the substrate by a pair of guide members 62 and 63 each formed of a guide slit and a guide pin, and is normally biased upwardly in FIG. 1 by a tension spring 64. A recording-playback head 66 is mounted on the head-supporting board 48. A rotatable pinch roller lever 72 for supporting a pinch roller 74 is mounted on the substrate by a pivotal pin 68 and normally urged by a tension spring 70 to be rotated clockwise about the pivotal pin 68. A capstan shaft 76 is positioned close to the pinch roller 74. The free end 73 of the pinch roller lever 72 is made engageable with a projection 78 of the head-supporting board 48.

It will now be described how the above-described braking mechanism operates. When the playback button 46 is pushed, then the main switch 52 is rendered conductive. At this time, the seesaw lever 40 is rotated clockwise about the pivotal pin 44 (FIG. 1). At the clockwise rotation of the seesaw lever 40, the head-supporting board 48 slides downward as seen in FIG. 1 against the urging force of the tension spring 64, causing the head 66 to touch a magnetic tape 80. The head-supporting board 48 and projection 78 also slide downward, causing the pinch roller lever 72 to be rotated clockwise about the pivotal pin 68 by the urging force of the tension spring 70. As a result, a tape 80 is clamped between the capstan shaft 76 and pinch roller 74, thereby setting the tape recorder for the playback mode. Since, at this time, the head-supporting board 48 and link 16 are moved downward, and the brake shoes 27 and 28 of the brake band 14 do not touch the brake disc 25 and 26. As a result, the brake mechanism 10 can not make a braking action. At this time, the pushed playback button 46 is locked at a prescribed position by being engaged with one end of the lock lever 56 normally urged by the tension spring 54.

Figure 3:
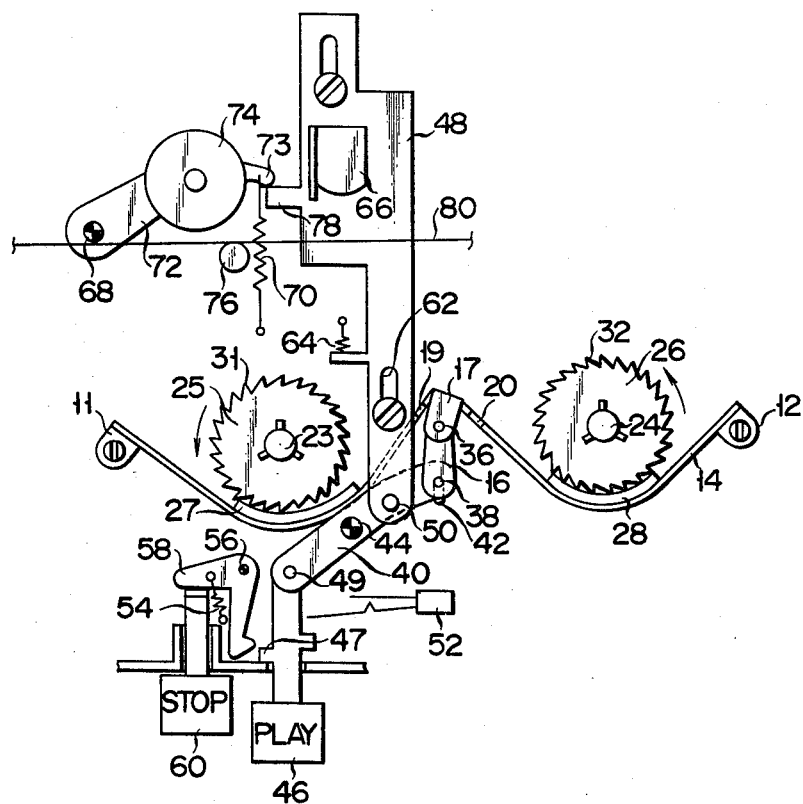
FIG. 3 is a plan view of the main section of a tape recorder which is fitted with a braking mechanism embodying the invention and set for the stop mode.

The changeover of the operation of the tape recorder from the playback mode to the stop mode is effected by pushing the stop button 60. When, during the playback mode of FIG. 1, the stop button 60 is pushed, the stop button 60 contacts the lock lever 58, causing this lock lever 58 to be rotated clockwise about the pivotal pin 56 against the urging force of the tension spring 54, thereby releasing the lock lever 58 from the engagement attachment 47 of the playback button 46 (FIG. 3). When disengaged from the lock lever 58, the playback button 46 is rendered free and slides upwardly as seen in FIG. 3 by the urging force of the tension spring 64, that is, in the direction in which the recording-playback head 66 is separated from the magnetic tape. Consequently, the seesaw lever 40 is rotated counterclockwise about the pivotal pin 44, causing the playback button 46 to regain a projecting state (FIG. 3). When the seesaw lever 40 is rotated counterclockwise, then the link 16 slides upward as seen in FIG. 1, because the pin 38 is guided through the guide-slit 42 formed in the substrate. At the upward sliding of the link 16, the brake shoes 27 and 28 of the brake band 14 are pressed respectively against the brake discs 25 and 26. Where, as shown in FIG. 3, the brake shoes 27 and 28 of the brake band 14 are pressed respectively against the brake discs 25 and 26 which are rotated counterclockwise, then the brake member 32 of the brake disc 26 whose position represents the tape-feeding side for the playback mode has its teeth made to cut into the corresponding brake shoe 28. On the other hand, the brake member 31 whose position denotes the tape take-up side slips over the corresponding brake shoe 27 without cutting thereinto. In other words, a greater braking force or frictional force is applied to the tape-feeding side than to the tape take-up side. Therefore, a braking action is taken with the magnetic tape 80 subjected to a great backward acting tension. Where the brake discs 25 and 26 undergo a braking force due to engagement between the brake shoes 27 and 28 and the corresponding brake members 31 and 32, then braking forces are applied to the brake discs 25 and 26. Eventually, a greater braking force is applied to the tape-feeding reel than to the tape take-up reel. As described above, the central bent portions 17 and 18 of the brake band 14 are rotatably connected to the link 16 by the pivotal pin 36. Further, a greater braking force is applied to the tape-feeding reel. As a result, the brake band 14 is drawn toward the tape-feeding reel, causing the central bent portions 17 and 18 to be twisted clockwise about the pivotal pin 36.

Figure 4:
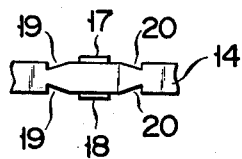
FIG. 4 is a front view of a modification of the brake band.

Therefore, the brake band 14 does not have its length equally divided. In other words, that portion of the brake band 14 facing the tape take-up reel is made shorter than that portion of the brake band 14 facing the tape-feeding reel. Consequently, the brake shoe 27 is pressed against the corresponding brake disc 25 without giving rise to the sagging of the brake band 14, thereby causing a braking force applied to the brake disc 25 to be progressively increased. In contrast, that portion of the brake band 14 facing the tape-feeding side is made longer, tending to sag. A portion of the brake shoe 28 therefore moves away from the corresponding brake disc 26, thereby progressively reducing a braking force applied to the brake disc 26. The more the central bent portions 17 and 18 are twisted, the more equal become the braking forces which are applied to the brake discs 25 and 26. Eventually the same braking force will be applied to the brake discs 25 and 26. The notches 19 and 20 are so shaped that both bent portions 17 and 18 can be easily twisted. If necessary, another pair of notches 19 and 20 may be formed on the lower edge of the brake band 14 as illustrated in FIG. 4.

When the head-supporting board 48 slides as seen in FIG. 1, urged by the tension spring 64, the head 66 leaves the tape. The pinch roller lever 72 therefore rotates counterclockwise about the pivotal pin 68 by the projection 78, against the urging force of the tension spring 70. Consequently the pinch roller 74 is released from the capstan shaft 76.

Figure 5:
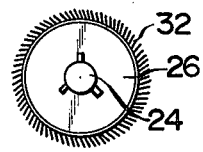
FIG. 5 is a plan view of a modification of the brake ring.

The above-described embodiment uses brake members which are toothed. According to this invention the brake members are not limited to toothed ones. Brake members of other types may be used instead as long as they cut into the corresponding brake shoes when the corresponding brake discs rotate in one direction and slip over the corresponding brake shoe when the corresponding brake discs rotate in the other direction. For example, such a brake member 32 as shown in FIG. 5 may be used. This member 32 is a flexible sheet which, like a seal's hide, has countless piles inclining in one direction and which is bonded on the outer periphery of the corresponding braking disc.

In the embodiment of FIGS. 1 and 3, the bent portions 11 and 12 of the brake band 14 are rotatably mounted on the substrate. They may be immovably secured to the substrate if the brake band 14 has a sufficient flexibility. Further, the central bent portions 17 and 18, which are rotatably connected to the link 16 which is in turn rotatably attached to the seesaw lever 40, may be rotatably connected directly to the seesaw lever 40.

As mentioned above, the tape recorder braking mechanism according to this invention is characterized by a brake band with a connecting means which is rotatably connected to a movable member interlockingly operated with a playback button. The mechanism is characterized also by a pair of brake discs which are attached respectively to two reel shafts and each of which is provided with a braking member. Each braking member cuts into the brake band when the corresponding brake disc rotates in one direction and slips over the brake band when the corresponding brake disc rotates in the other direction. The brake members are so designed that they alternately cut into the brake band. Thus, initially a great braking force acts on the brake disc whose braking member is cutting into the brake band, thereby preventing the sagging of the tape. The central bent portions of the brake band are drawn toward the brake disc applied with a greater braking force and are then twised, whereby the braking forces applied on the reels are made substantially equal. At the start of a braking process different braking forces are applied on the reels, thus preventing the sagging of the tape. Thereafter the difference between the two braking forces is gradually reduced. When the braking forces become equal at last, both the reels are braked to the same extent. The tape is stopped smoothly in good timing, and no sagging of the tape takes place.

What is claimed is:

1. In a tape recorder, an improved braking mechanism for applying respective braking forces to a pair of reel shafts of the tape recorder, comprising:

an elongated brake band made of flexible material and having two opposite end portions;

means for rotatably mounting said end portions spaced from each other;

a connecting means coupled to a middle portion of said brake band and being rotatably connected to a movable member which operates interlockingly with an operation mode button of the tape recorder; and a pair of brake discs mounted respectively on the reel shafts of the tape recorder, each brake disc having on the periphery thereof a brake member, said brake members each including a plurality of protruding portions which are inclined at a predetermined angle to the radial direction of the respective brake disc, the plurality of protruding portions of each respective brake member being inclined in the same direction relative to said radial direction, and the protruding portions of one of said brake members being inclined unidirectionally in the opposite direction to the unidirectional inclination of the protruding portions of the other of said brake members;

said brake band having respective portions which are adapted to be pushed against respective brake members to engage said respective brake members when the operation mode button is operated such that said brake members cut into a corresponding portion of the brake band when a corresponding brake disc rotates in one direction and slip over the corresponding portion of the brake band when the corresponding brake disc rotates in the other direction, when said brake band is engaged with said brake members.

2. The braking mechanism of claim 1, wherein said protruding portions of said brake members comprise sawteeth on the outer peripheries thereof.

3. The braking mechanism of claim 1 wherein said brake members comprise flexible sheets which are mounted respectively on the outer peripheries of said brake discs and which have a large plurality of piles inclining in one direction, said piles comprising said protruding portions of said brake members.

4. The braking mechanism of any one of claims 1, 2 or 3 wherein said connecting means includes a pair of central portions of said brake band which are bent from the upper edge and lower edge of the brake band, respectively.

5. The braking mechanism of claim 4, wherein a pair of notches are formed in at least one of the upper edge and lower edge of the brake band at such positions as to surround a central bent portion of the brake band, thereby ensuring a smooth rotation of the central bent portions.

* * * * *

UNITED STATES PATENT AND TRADEMARK OFFICE
CERTIFICATE OF CORRECTION

PATENT NO. : 4,345,725

DATED : August 24, 1982

INVENTOR(S) : Toshikazu KATO

It is certified that error appears in the above-identified patent and that said Letters Patent is hereby corrected as shown below:

COLUMN 4, line 30, after "board 48" change "slides as seen in"

to --slides upward as seen in--.

Signed and Sealed this

Eighth Day of February 1983

[SEAL]

Attest:

GERALD J. MOSSINGHOFF

Attesting Officer

Commissioner of Patents and Trademarks